United States Patent
Rakshit (10) Patent No.: US 8,943,074 B2
(45) Date of Patent: Jan. 27, 2015

(54) GENERATING AND DISPLAYING AN IMAGE TOUR IN RESPONSE TO A USER SEARCH QUERY

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 13/759,411

(22) Filed: Feb. 5, 2013

(65) Prior Publication Data

US 2014/0222781 A1 Aug. 7, 2014

(51) Int. Cl.
*G06F 17/30* (2006.01)

(52) U.S. Cl.
CPC ...... *G06F 17/3005* (2013.01); *G06F 17/30058* (2013.01); *G06F 17/30064* (2013.01); *G06F 17/30864* (2013.01); *G06F 17/30061* (2013.01)
USPC ............................ 707/752; 707/706; 715/202

(58) Field of Classification Search
CPC .......... G06F 17/3005; G06F 17/30058; G06F 17/30061; G06F 17/30064; G06F 17/30864
USPC ................................... 707/706, 752; 715/202
See application file for complete search history.

(56) References Cited

U.S. PATENT DOCUMENTS

| 7,548,936 | B2 | 6/2009 | Liu et al. |
| 7,725,451 | B2 | 5/2010 | Jing et al. |
| 8,209,330 | B1 | 6/2012 | Covell et al. |
| 2008/0028341 | A1* | 1/2008 | Szeliski et al. ................ 715/854 |
| 2011/0194761 | A1 | 8/2011 | Wang et al. |
| 2012/0110453 | A1 | 5/2012 | Ma et al. |
| 2014/0074759 | A1* | 3/2014 | Lewis et al. ..................... 706/12 |

FOREIGN PATENT DOCUMENTS

WO 2012058794 A1 5/2012

OTHER PUBLICATIONS

"IGroup: Presenting Web Image Search Results in Semantic Clusters", Wang et al, Chi 2007, Apr. 28-May 3, 2007, San Jose, California, USA, Proccedings of the SIGCHI Conference on Human Factors in Computing Systems.
"Re-ranking of Web Image Search Results using a Graph Algorithm", Hilal Zitouni et al., Pattern Recognition, 2008, ICPR 2008.
"Effective Browsing of Web Image Search Results", Hao Liu et al., Proceedings MIR 2004, Proceedings of the 6th ACM SIGMM International Workshop on Multimedia Information Retrieval.

(Continued)

*Primary Examiner* — William Spieler
(74) *Attorney, Agent, or Firm* — John Pivnichny (57) ABSTRACT

A method, system and a computer program product for generating an image tour in response to a search query in one or more multimedia databases includes determining information corresponding to a first and last image of the image tour by conducting an analysis of the search query. Based on this information, the first and last images satisfying a first predefined criteria are identified from the multimedia database. At least one intermediate image satisfying a second predefined criteria is identified from one or more videos of the multimedia database based on the identified first and last images. The image tour is generated by placing the identified intermediate images between the first and last images.

21 Claims, 4 Drawing Sheets

(56) References Cited

OTHER PUBLICATIONS

"Office Business Application for Customer Support Management", Office 2007, http://msdn.microsoft.com/en-us/library/cc185134(v=office.12).aspx, copyright Microsoft 2013.

"VisualRank: Google's new image search algorithm", Apr. 29, 2008, http://biswaroop.wordpress.com/2008/04/29/visualrank-googles-new-image-search-algorithm/.

"Image Search", https://developers.google.com/custom-search/docs/structured_search#image, Last updated Jun. 13, 2012, copyright Google.

\* cited by examiner

GENERATING AND DISPLAYING AN IMAGE TOUR IN RESPONSE TO A USER SEARCH QUERY

FIELD OF THE INVENTION

The present invention generally relates to image search, and more particularly, to a method, system and computer program product for generating an image tour in response to a search query in one or more multimedia databases.

BACKGROUND OF THE INVENTION

The use of World Wide Web (www) or the internet by people to search information has been on an exponential rise. People have been logging on to the internet for searching almost any kind of information these days. In addition to the traditional text-based search, image and video searches are also popular amongst the internet users.

It is a known fact that comprehending and assimilating information through images is easy and faster than text based information. Image search on the internet works similar to the text based search. After the user inputs the text search query into the image search engine of the image search service provider, the metadata information of the images stored in the image database or webpages containing images are mapped for the search query. Thereafter, images whose metadata information matches with the search query may be made available to the user as the search result. Such a search output is simply irrelevant for certain search queries, such as 'Train trip from New York to Washington', 'Guided tour for installation of a software' etc. For such queries, image search result is preferred in a set of sequentially arranged images (image tour) in consonant with the search query. Users, out of no choice, often turn to video search engines such as YouTube (www.youtube.com) for such queries and have to be satisfied with videos instead of images. However, for certain search queries such as 'Guided tour for installation of a software', an image tour is preferred against a corresponding video, since the user does not have to pause the video each time before performing a step of the software installation process he just learned after watching the video. In case of an image tour, each image of the image tour corresponds to a step of the new software installation process. The user can simply move onto a next image of the image tour after he has completed the step. Moreover, it may not be feasible for the user to convert the video into an image tour.

For queries such as 'Train trip from New York to Washington', the video search result may return a large number of videos shot by users. Usually, a majority of such videos are short length videos shot at different intervals from New York to Washington. Thus, it is possible that certain portions en route from New York to Washington may not have been shot by one user (missing certain points of interest along the route) but may have been shot by other users. Thus the user may have to scan through all the videos to view complete video of the trip. Such is tedious and time consuming.

SUMMARY

A method, system and computer program product for generating an image tour in response to a search query in one or more multimedia databases is disclosed and claimed herein. Exemplary embodiments may comprise determining information corresponding to a first and last image of the image tour by conducting an analysis of the search query. Based on this information, the first and last images satisfying a first pre-defined criteria are identified from one or more multimedia databases comprising images and videos. Further, one or more intermediate image satisfying a second pre-defined criteria are collated (searched and arranged in a sequence) from one or more videos of the multimedia database based on the identified first and last images. The image tour is generated by placing the one or more intermediate images between the first and last images.

An image tour is a group of images arranged in a particular order. According to the preferred embodiment, the image tour is a group of sequentially arranged images wherein the sequence is defined by the search query.

The embodiments may include identifying the first and last images by mapping their corresponding information determined from the analysis of the search query from within a group consisting of metadata information of images or videos, or user comments provided by prior viewers thereof The collation of intermediate images according to the embodiments may include searching for image frames similar to the first or last or both images in a video of the multimedia database. If only one image frame is found similar to the first image, one or more image frames subsequent to that image frame are identified as the intermediate images. If the image frame found is similar to the last image, one or more image frames prior to that image frame are identified as the intermediate images. However, if two images frames are found similar to the first and last images respectively, one or more image frames disposed between them are identified as the intermediate images. The collation may further include iteratively searching one or more subsequent videos of the multimedia database for image frames similar to the one or more intermediate images and identifying image frames adjacent to each image frame found similar to the one or more intermediate images thus expanding the number of intermediate images at each searched video. According to the embodiments, the determination of similarity between image frames may be based on a match of one or more pre-defined features of the image frames such as objects within the image frames, metadata information of the image frames, etc.

According to a preferred embodiment, the first pre-defined criteria is satisfied by at least one of the following; quality of images and repetition count of the images found. The second pre-defined criteria is satisfied by at least one of the following: at least one image frame identified from a video absent in a previously searched video, quality of the image frames or number of images being preferred by a user in the image tour.

The embodiments may also include that the image tour is generated in response to a search query in a secondary multimedia database searched and prepared from the multimedia databases based on the information determined from the analysis of the search query.

DETAILED DESCRIPTION

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware embodiments that may all generally be referred to herein as a "circuit," "module" or "system". Furthermore, embodiments of the present invention may take the form of a computer program product, embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
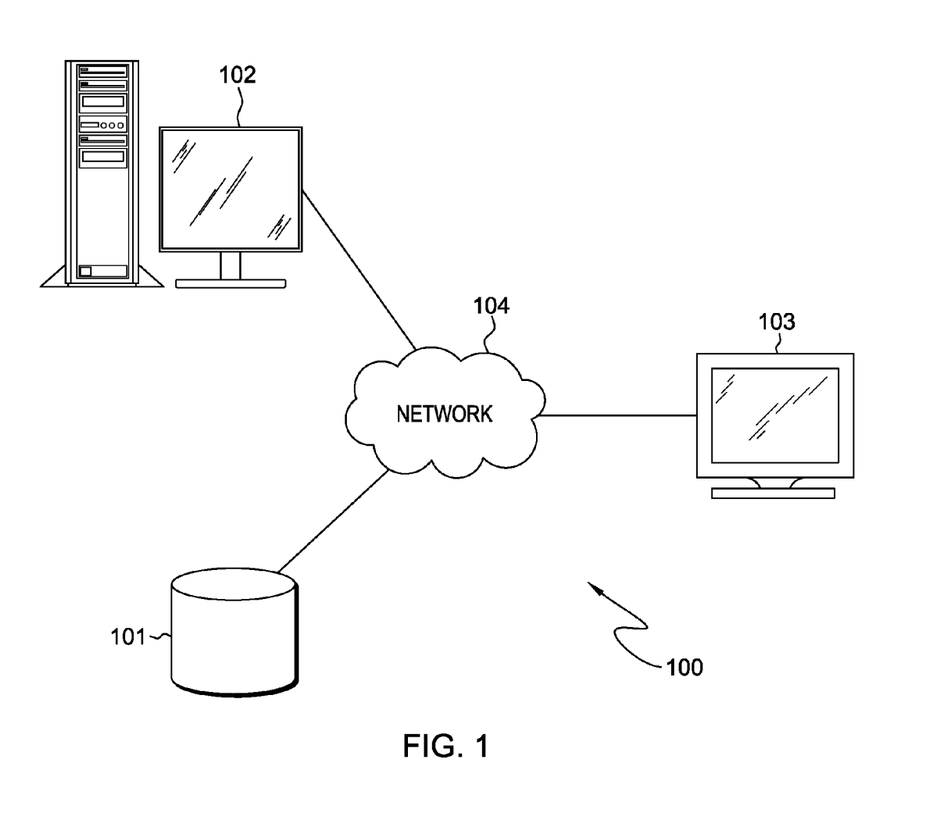
FIG. 1 illustrates a basic functional block diagram of a system for implementing an embodiment of the present invention.

FIG. 1 illustrates a basic functional block diagram of a system 100 for implementing an embodiment of the present invention. The system 100 comprises a networked computer infrastructure and one or more storage units 101 storing one or more multimedia databases comprising images or videos or both. The computer infrastructure according to the preferred embodiment comprises a network of search engine server 102 and client computers 103 connected to each other and communicating with each other as well as the storage units 101 through the network 104. The network 104 includes wired or wireless connections. The system 100 may be implemented as different types of networks 104, such as intranet, internet (the world wide web), a local area network (LAN), or a wide area network (WAN). FIG. 1 is intended as an example, and not as an architectural limitation.

Figure 2:
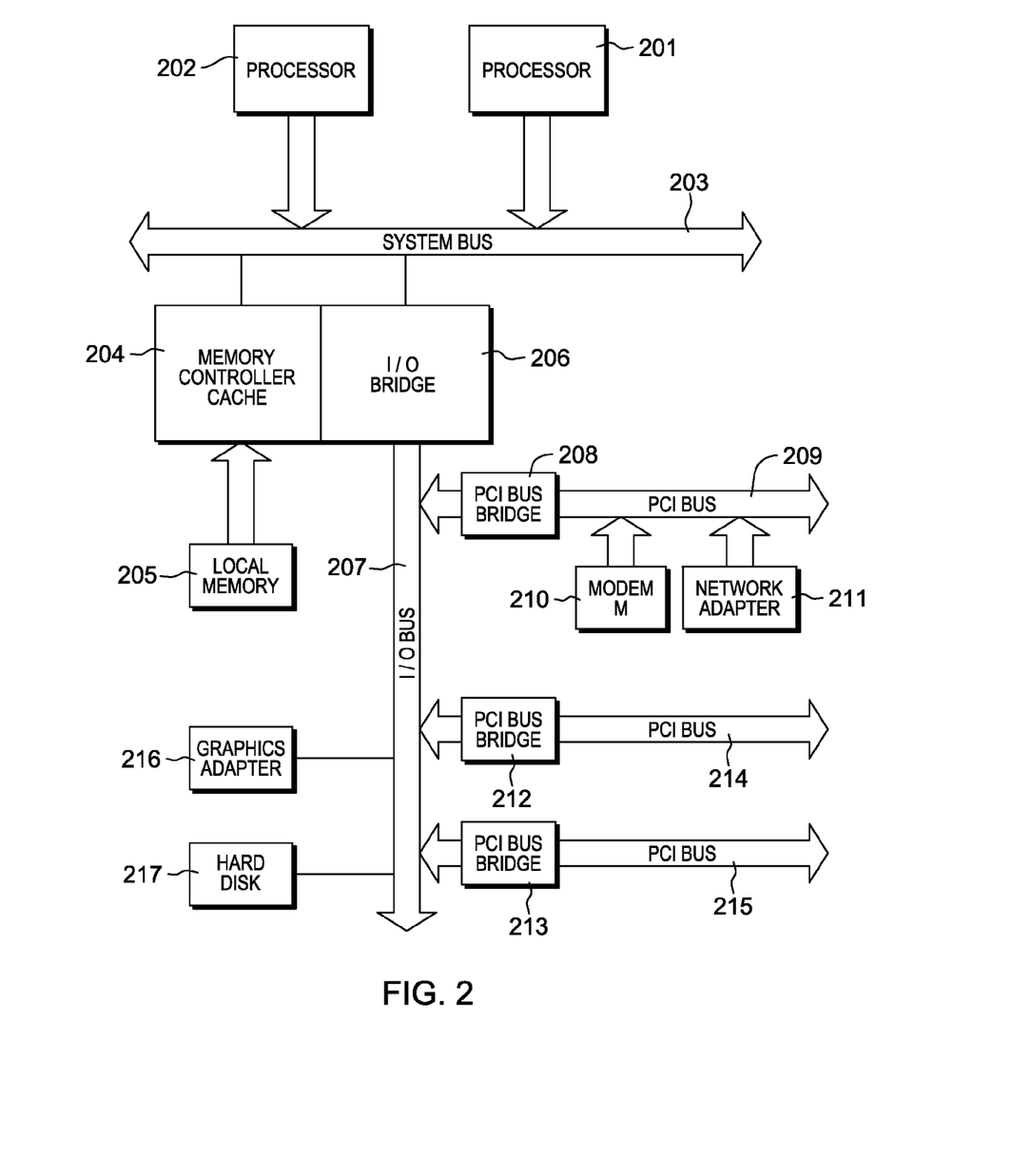
FIG. 2 illustrates a search engine server in the system of FIG. 1 according to an embodiment of the present invention.

FIG. 2 illustrates a search engine server 102 in the system 100 of FIG. 1. The search engine server 102 may comprise a plurality of processors 201, 202 and connected to the system bus 203. Alternatively, single processor may also be employed. The processor(s) 202, 203, according to the preferred embodiment, are configured and programmed with computer run program codes to run as a search engine capable of searching objects/files in storage units (101 of FIG. 1) operably connected therewith through the network (104 of FIG. 1). The searching is typically triggered by receiving a corresponding search query by it through client computers (103 of FIG. 1) interfaced therewith though the network 104. Also, connected to the system bus 203 is a memory controller/cache 204, which provides an interface to local memory 205. I/O bus bridge 206 is connected to system bus 203 and provides an interface to I/O bus 207. Memory controller/cache 204 and I/O bus bridge 206 may be integrated as depicted.

Peripheral component interconnect (PCI) bus bridge 208 connected to I/O bus 207 provides an interface to PCI local bus 209. A number of modems 210 may be connected to PCI local bus 209. Typical PCI bus 209 implementations will support four PCI expansions slots or add-in connectors. Communications links to client computers 103 in FIG. 1 may be provided through modem 210 and network adapter 211 connected to PCI local bus 209 through add-in boards. Additional PCI bus bridges 212, 213 provide interfaces for additional PCI local buses 214, 215, from which additional modems or network adapters may be supported thus allowing connections to multiple network client computers 103 of FIG. 1. A memory-mapped graphics adapter 216 and hard disk 217 may also be connected to I/O bus 207 as depicted, either directly or indirectly.

Those in the ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations and is only a possible means of implementing the embodiment of the present invention.

Figure 3:
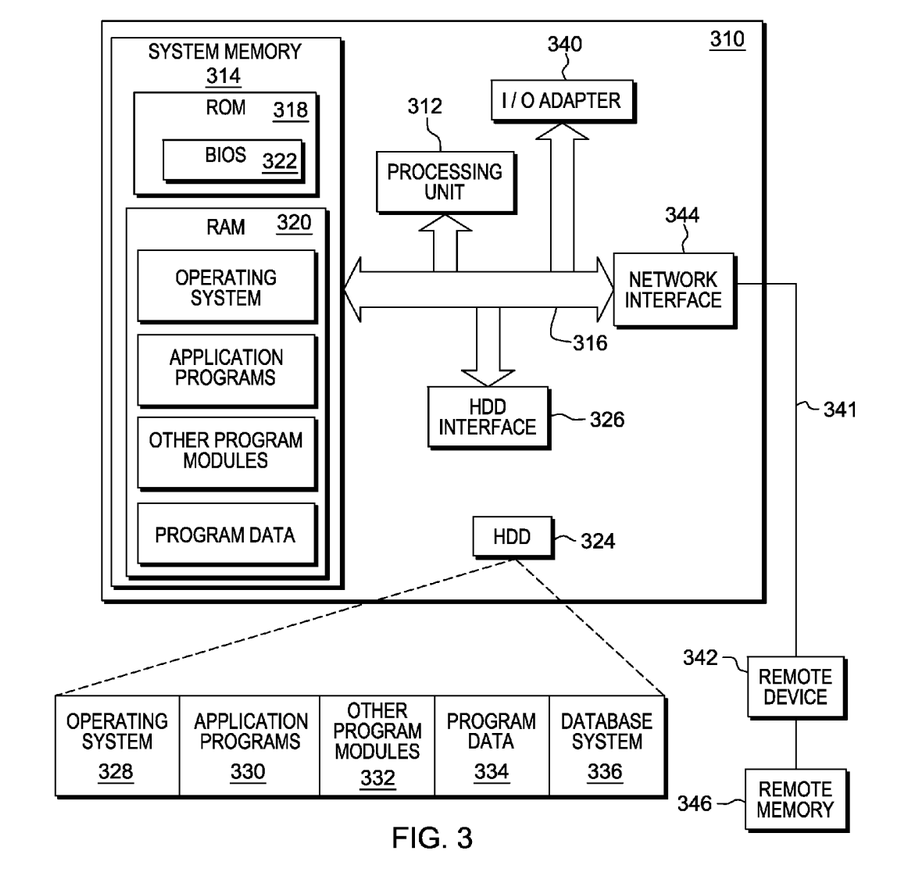
FIG. 3 illustrates a client computer in the system of FIG. 1 according to an embodiment of the present invention.

Referring to FIG. 3, which illustrates a client computer 103 in the system of FIG. 1, includes a computing device 310, which in turn includes a processing unit 312, a system memory 314, and a system bus 316 that couples various system components including the system memory 314 to the processing unit 312. The system bus 316 may be any of several types of bus architectures, including a memory bus, a memory controller, a peripheral bus, and a local bus using any of a variety of bus architectures, such as PCI. The system memory 314 includes a Read Only Memory (ROM) 318 and a Random Access Memory (RAM) 320. A Basic Input/Output System (BIOS) 322, containing the basic routines that help to transfer information between elements within the computing device 310, such as during start-up, is stored in the ROM 318. The computing device 310 further includes a Hard Disk Drive (HDD) 324 as computer-readable storage media. The HDD 324 is connected to the system bus 316 by an HDD interface 326. The HDD 324 provides a non-volatile storage for computer-readable instructions, data structures, program modules, and other data for the computing device 310. Although the exemplary environment described herein employs the HDD 324, it should be appreciated by those skilled in the art that other types of computer-readable storage media, which can store data that is accessible by computer, such as RAM, ROM, removable magnetic disks, removable optical disks, and the like may also be used in the exemplary operating environment.

A number of program modules may be stored on the HDD 324, including an operating system 328, one or more application programs 330, other program modules 332, program data 334, and a database system 336. The operating system 328, the one or more application programs 330, the other program modules 332 and program data 334 may be loaded onto the system memory 314 and specifically onto the RAM 320 during the functioning of the computing device 310. A user may provide commands and information through input devices, such as a keyboard, and receive output through peripheral output devices, such as monitor, speaker, printer, etc. These input and output devices are often connected to the processing unit 312 through an I/O adapter 340 coupled to the system bus 316.

In a networked environment, the computing device 310 may be connected to a remote computing device 342 through a network interface card 344. It will be appreciated that the network connections shown are exemplary, and any conventional means 341 of establishing communications links between the computers, such as a local area network, wide are network or wireless connection, may be used. In a networked environment, program modules depicted relative to the computing device 310, or its components, may be stored in a remote memory 346. The remote computing device 342 may be a personal computer, a router, a server, a network PC, a peer device, or other common network device.

Those of the ordinary skill in the art will appreciate that the hardware in FIG. 3 is a basic client computing device and may vary depending on the implementation. The architecture of the aforementioned computing device is not limiting and is only depicted as an example on which an embodiment of the present invention may be implemented. Other types of client computers such as a smart phone or a web-kiosk are well within the intended scope on which an embodiment of the present invention may be implemented.

It will also be appreciated by a person skilled in the art that although the search engine server 102, client computer 103 and storage unit 101 are shown as different elements in the preferred embodiments, it may not be necessary so. All the three elements may be combined into one computing device capable of performing an embodiment of the invention.

The user, through the client computer 103, enters a text search query which is received by the search engine server 102 through the network for further processing.

The search engine server 102 may, according to a different embodiment of the invention, be local to the client computer 103. Similarly, the client computer 103 may be local to the search engine server 102. Also, the storage unit 101 storing multimedia databases comprising images and videos may not be separate entities and may be local to the search engine server 102 or client computer 103 or both.

A user enters a text search query in a search field of a web page or application of the 'Search Service Provider' running on a client computer 103. The user further selects a radio button provided next to the search field for opting to receive and see the search result in the form of an image tour. An image tour is a group of images arranged in a particular order. According to the preferred embodiment, the image tour is a group of sequentially arranged images wherein the sequence is defined by the search query. Upon hitting the 'enter' button next to the search field, the search query is transmitted to the search engine server 102.

It will be apparent to a person skilled in the art that the existence of a radio button is not mandatory for receiving an image tour in response to the search query. The software and hardware infrastructure mentioned above for receiving the search query is only for illustrative purposes and should not be construed as limiting. Moreover, the search query may not be limited to a text based query but may also be fed as a voice search query.

The search engine server 102 determines information corresponding to a first and last image of the image tour to be generated by conducting an analysis of the search query received by it, for example a text search query. For example, if the search query is 'Train trip from New York to Washington DC', then the determined information (after analysis) corresponding to the first image of the image tour is 'New York Railway Station' and that of the last image is 'Washington DC Railway Station'. The analysis and subsequent determination of information may be performed by commonly used technology or algorithms known by a person skilled in the art. The software and/or hardware combination/configuration for performing the analysis may be local to the search engine server 102 or external to the search engine server 102 and accessible thereto.

According to a different embodiment of the invention, one or more secondary multimedia databases are created comprising images and videos having the above determined information in their metadata or in the comments section provided by the viewers thereof. For the purpose of this search query, all further searches in the database are performed within the secondary databases. Thus a pool of images and videos is created which are to be searched for generating an image tour in response to the aforementioned search query.

After determining the above information in respect of the first and last images of the image tour, the search engine server 102 identifies the first and last images of the image tour by mapping their corresponding information determined from the analysis of the search query from within a group consisting of metadata information of images or videos or both, or user comments provided by prior viewers thereof If a plurality of images are identified, say in respect of the first or last or both the images of the image tour, the images are filtered based on a first pre-defined criteria (set by user or system) such as quality of the images or repetition count of the images, to identify one image each as the first and last image of the image tour.

For collating the intermediate images, the search engine server 102 searches a randomly selected first video in the multimedia database for image frames similar to the first and last images of the image tour. If only one image frame is found which is similar to the first image, one or more image frames subsequent to that image frame are identified as the intermediate images. If the image frame found is similar to the last image, then one or more image frames prior to that image frame are identified as the intermediate images. However, if two image frames are found similar to the first and last images respectively, one or more image frames between those two image frames are identified as the intermediate images. If the search result is negative, i.e., no image frame similar to the first or last image is found, iteratively subsequent videos of the multimedia database are searched until an image frame similar to the first or last image is found. According to the embodiments, the determination of similarity between image frames may be based on a match of one or more pre-defined features of the image frames such as objects within the image frames, metadata information of the image frames, etc. Commonly available image recognition or comparing softwares/algorithms may be used to determine similarity between image frames. The software and/or hardware combination/configuration for determining similarity between the image frames may be local to the search engine server 102 or external to the search engine server 102 and accessible thereto.

The search engine server 102 is configured such that the images being identified as the intermediate images satisfy one or more second pre-defined criteria set by the user or preset within the system such as at least one image frame identified from a video absent in a previously searched video, the quality of the at least one intermediate image or the number of images preferred by the user in the image tour. For example, if according to an embodiment of the invention, the user is provided with an option of number of images to be displayed in the image tour at the time of inputting the search query, the search engine server 102 limits the number of intermediate images to the preference of the user. The images of intermediate images being identified may also be filtered based on the quality of images or other such pre-defined criteria.

According to a preferred embodiment, the number of identified intermediate images may be further expanded by searching one or more other videos of the multimedia database and identifying image frames adjacent to each image frame found similar to one or more identified intermediate images. The search engine server 102 randomly selects a second video of the multimedia database and searches for image frames similar to one or more images of the identified intermediate images identified from a previously searched video. One or more image frames adjacent to each searched image frame similar to an identified intermediate image are identified and placed at a corresponding position within the identified intermediate images from the first video. Thus the number of the intermediate images is expanded.

The image frames from the second video may also satisfy one or more of the second pre-defined described above. For example, the image frames being identified from second video are only those image frames which are absent in the previously searched video, i.e., the first video, are not prior or subsequent to the first or last image respectively. Quality as well as quantity of the images may also be a criterion here as described earlier.

It is to be noted that the term 'adjacent' is not to be construed limiting. Image frames not immediately adjacent but at an interval of few image frames from the reference image frame which is found similar to an intermediate images are also intended to be within the scope of the definition of the term 'adjacent'.

Similarly, subsequent videos of the multimedia database may be iteratively searched. At each step, the number of intermediate images is 'expanded' since image frames adjacent to one or more images of the intermediate images are identified. The identified or collated intermediate images as described above are placed between the first and last images of the image tour thereby generating the image tour.

The generated image tour is subsequently sent to the client computer 103 which displays it on a display device thereof to the user. The client computer 103 may be operable to display the image tour in a pre-defined format such a slide show, list view, grid view etc.

Figure 4:
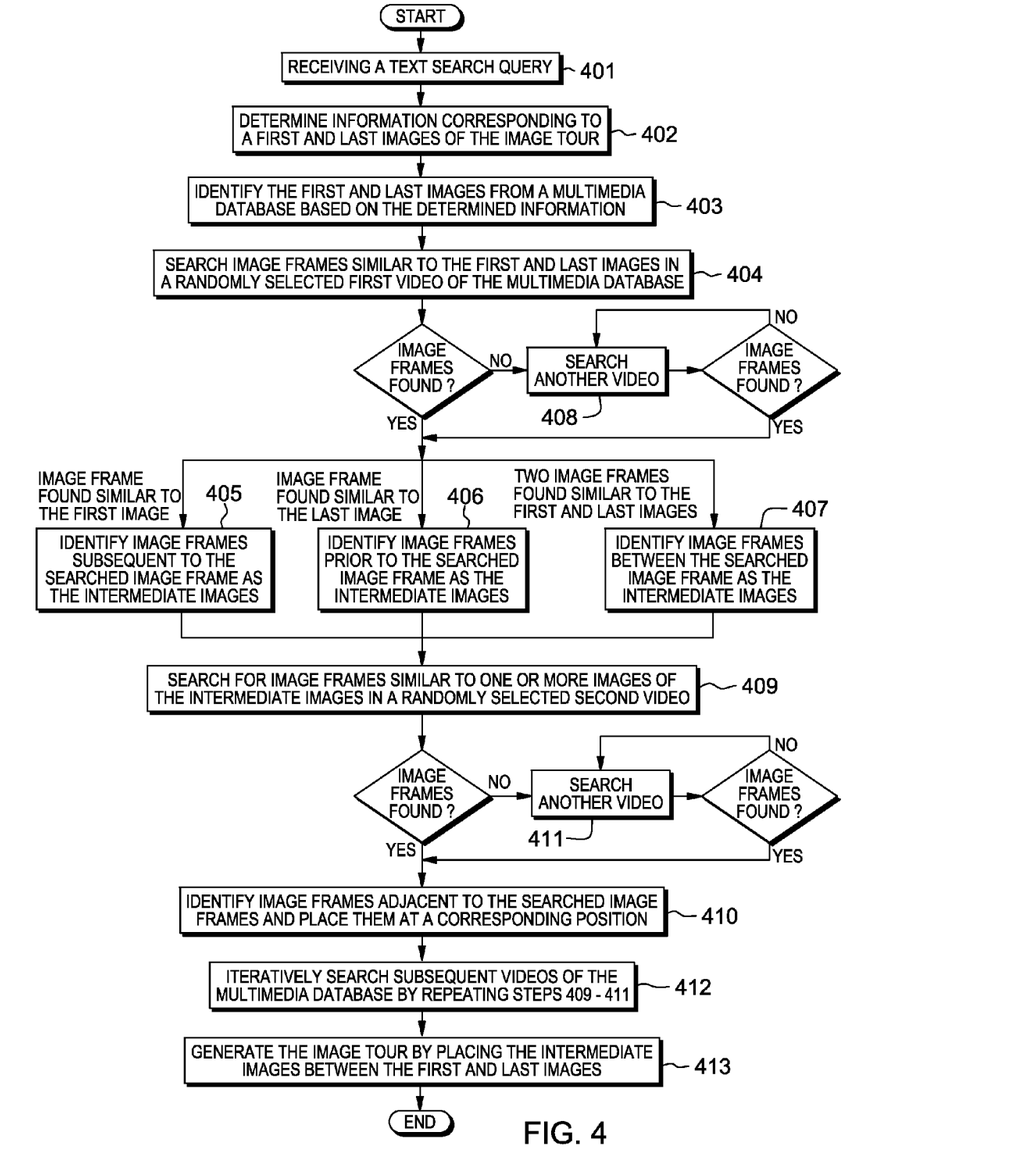
FIG. 4 illustrates a flowchart depicting steps to be performed for implementing an embodiment of the present invention.

FIG. 4 illustrates a flowchart depicting steps to be performed for implementing an embodiment of the present invention.

At step 401, a text search query is received. At step 402, information corresponding to a first and last image of the image tour to be generated by conducting a analysis of the text search query. For example, if the search query is 'Train trip from New York to Washington DC', then the determined information corresponding to the first image of the image tour (after analysis) is 'New York Railway Station' and that of the last image is 'Washington DC Railway Station'. The analysis and subsequent determination of information may be performed by commonly used technology or algorithms known by a person skilled in the art. An image tour is a group of images arranged in a particular order. According to the preferred embodiment, the image tour is a group of sequentially arranged images wherein the sequence is defined by the search query.

According to a different embodiment of the invention, one or more secondary multimedia databases are created comprising images and videos having the above determined information in their metadata or in the comments section provided by the viewers thereof. For the purpose of this query, all further searches in the database are performed within the secondary database. Thus a pool of images and videos is created which are to be searched for generating an image tour in response to the aforementioned search query.

At step 403, the first and last images of the image tour are identified by mapping their corresponding information determined from the analysis of the search query from within a group consisting of metadata information of images or videos or both, or user comments provided by prior viewers thereof.

If a plurality of images are identified, say in respect of the first or last or both the images of the image tour, the images are filtered based on a first pre-defined criteria (set by user or system) such as quality of the image or repetition count of the images, to identify one image each as the first and last image of the image tour.

At steps 404-412, intermediate images are collated according to a preferred embodiment of the invention. At step 404, a randomly selected first video in the multimedia database is searched for image frames similar to the first and last images of the image tour. If only one image frame is found which is similar to the first image, one or more image frames subsequent to that image frame are identified as the intermediate images at step 405. If the image frame found is similar to the last image, one or more image frames prior to that image frame are identified as the intermediate images at step 406. However, if two image frames are found similar to the first and last images respectively, one or more image frames between those two image frames are identified as the intermediate images at step 407. If the search result is negative, i.e., no image frame similar to the first or last image is found, at step 408, the search simply moves onto another video of the multimedia database. The step 408 is iterated (in all subsequent videos of the multimedia database) until an image frame similar to the first or last image is found. According to the embodiments, the determination of similarity between image frames may be based on a match of one or more pre-defined features of the image frames such as objects within the image frames, metadata information of the image frames, etc. Commonly available image recognition or comparing softwares/algorithms may be used to determine similarity between image frames.

The intermediate images should satisfy one or more second pre-defined criteria such as at least one image frame identified from a video absent in a previously searched video, the quality of the at least one intermediate image or the number of images preferred by the user in the image tour to qualify as intermediate images. For example, if according to an embodiment of the invention, the user is provided with an option of number of images to be displayed in the image tour at the time of inputting the search query, the number of intermediate images being identified is correspondingly limited. The images of intermediate images being identified may also be filtered based on the quality of images or other such pre-defined criteria.

As described at steps 409-412, the number of intermediate images may be further expanded by searching one or more other videos of the multimedia database and identifying image frames adjacent to one or more images of the intermediate images. Alternatively, steps 409-412 may be omitted to perform the step 413.

At step 409, a randomly selected second video of the multimedia database is searched for image frames similar to one or more images of the identified intermediate images. At step 410, one or more image frames adjacent to each searched image frame similar to an identified intermediate image are identified and placed at a corresponding position within the identified intermediate images from the first video. Thus the number of the intermediate images is expanded.

If the search is negative, i.e. no image frames similar to any images of the identified intermediate images are found, at step 411, the search simply moves on to another video of the multimedia database. The step 411 is iterated (in all subsequent videos of the multimedia database) until an image frame similar to an image of the identified intermediate images is found.

The image frames from the second video may also satisfy one or more of the pre-defined criteria described above. For example, the image frames being identified from second video are only those image frames which are absent in the previously searched video, i.e., the first video, are not prior or subsequent to the first or last image respectively. Quality as well as quantity of the images may also be a criterion here as described earlier.

It is to be noted that the term 'adjacent' is not to be construed limiting. Image frames not immediately adjacent but at an interval of few image frames from the reference image frame which is found similar to an image of the intermediate images are also intended to be within the scope of the definition of the term 'adjacent'.

At step 412, subsequent videos of the multimedia database may be iteratively searched to expand the number of intermediate images at each step. At the final step 413, the intermediate images are placed between the first and last images of the image tour thereby generating the image tour.

It should be noted that the steps illustrated in FIG. 4 are not all necessary for implementation of the present invention. For example, the steps 409-412 regarding expanding the number of intermediate images of the image tour are not necessary steps.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Certain search queries are best addressed with a series of sequentially arranged images or an image tour. According to the aforementioned embodiments of the invention, an image tour is generated and displayed to the user in response to his search query.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating an image tour in response to a search query in one or more multimedia databases, comprising the steps of:
   determining information corresponding to a first and second image of the image tour by conducting an analysis of the search query;
   identifying the first and second images from one or more multimedia databases based on the information, the first and second images being identified satisfying a first pre-defined criteria;

collating at least one intermediate image from one or more videos of the multimedia database based on the identified first and second images, the at least one intermediate image being collated satisfying a second pre-defined criteria; and generating the image tour by placing the at least one intermediate image between the first and second images.

2. The method of claim 1, wherein the first and second images are identified by mapping corresponding information determined from the analysis of the search query with the group consisting of metadata information of images, videos and user comments provided by prior viewers thereof.

3. The method of claim 1, wherein the step of collating at least one intermediate image includes the steps of:

searching for one or more image frames similar to the first or second images in a video of the one or more videos of the multimedia database; and identifying one or more image frames from the video subsequent to the searched image frames similar to the first image or prior to the searched image frames similar to the second image or disposed between searched image frames similar to the first and second images, the identified one or more image frames being the one or more intermediate images.

4. The method of claim 3, further including the steps of:

iteratively searching one or more subsequent videos of the multimedia database for image frames similar to the identified one or more intermediate images; and identifying one or more image frames adjacent to each image frame found similar to the identified one or more intermediate images.

5. The method of claim 1, wherein the first pre-defined criteria is satisfied by at least one of the following:

the quality of the images; and the repetition count of the images found.

6. The method of claim 1, wherein the second pre-defined criteria is satisfied by at least one of the following:

at least one image frame identified from a video absent in a previously searched video;

the quality of the at least one intermediate image; and the number of images preferred by the user in the image tour.

7. The method of claim 1, wherein the image tour is generated in response to a search query in a secondary multimedia database searched and prepared from the one or more multimedia databases based on the information determined from the analysis of the search query.

8. A system implemented in a hardware for generating an image tour in response to a search query in one or more multimedia databases, the system comprising a computer infrastructure operable to:

determine information corresponding to a first and second image of the image tour by conducting an analysis of the search query;

identify the first and second images from one or more multimedia databases based on the information, the first and second images being identified satisfying a first pre-defined criteria;

collate at least one intermediate image from one or more videos of the multimedia database based on the identified first and second images, the at least one intermediate image being collated satisfying a second pre-defined criteria; and generate the image tour by placing the at least one intermediate image between the first and second images.

9. The system of claim 8, wherein the first and second images are identified by mapping corresponding information determined from the analysis of the search query with the group consisting of metadata information of images, videos and user comments provided by prior viewers thereof.

10. The system of claim 8, wherein the computer infrastructure for collating the intermediate images is further operable to:

search for one or more image frames similar to the first or second images in a video of the one or more videos of the multimedia database; and identify one or more image frames from the video subsequent to the searched image frames similar to the first image or prior to the searched image frames similar to the second image or disposed between searched image frames similar to the first and second images, the identified one or more image frames being the one or more intermediate images.

11. The system of claim 10, wherein the computer infrastructure is further operable to:

iteratively search one or more subsequent videos of the multimedia database for image frames similar to the identified one or more intermediate images; and identify one or more image frames adjacent to each image frame found similar to the identified one or more intermediate images.

12. The system of claim 8, wherein the first pre-defined criteria is satisfied by at least one of the following:

the quality of the images; and the repetition count of the images found.

13. The system of claim 8, wherein the second pre-defined criteria is satisfied by at least one of the following:

at least one image frame identified from a video being absent in a previously searched video;

the quality of the at least one intermediate image; and the number of images preferred by the user in the image tour.

14. The system of claim 8, wherein the image tour is generated in response to a search query in a secondary multimedia database searched and prepared from the one or more multimedia databases based on the information determined from the analysis of the search query.

15. A computer program product comprising a computer usable storage medium having readable program code embodied in the storage medium, the computer program product comprises at least one component operable to:

receive a search query from a user for generating and displaying an image tour in response thereof;

determine information corresponding to a first and second image of the image tour by conducting an analysis of the search query;

identify the first and second images based on the information from one or more multimedia databases stored in one more storage mediums and operatively connected to the computer program product, the first and second images being identified satisfying a first pre-defined criteria;

collate at least one intermediate image from one or more videos of the multimedia database based on the identified first and second images, the at least one intermediate image being collated satisfying a second pre-defined criteria;

generate the image tour by placing the at least one intermediate image between the first and second images; and send the generated image tour to a display device of the computer program product for displaying thereof to the user.

16. The computer program product of claim 15, wherein at least one component of the computer program product is operable to identify the first and second images by mapping corresponding information determined from the analysis of the search query with the group consisting of metadata information of images, videos and user comments provided by prior viewers thereof.

17. The computer program product of claim 15, wherein at least one component the computer program product for collating the intermediate images is further operable to:
- search for one or more image frames similar to the first or second images in a video of the one or more videos of the multimedia database; and
- identify one or more image frames from the video subsequent to the searched image frames similar to the first image or prior to the searched image frames similar to the second image or disposed between searched image frames similar to the first and second images, the identified one or more image frames being the one or more intermediate images.

18. The computer program product of claim 17, wherein at least one component of the computer program product is further operable to:
- iteratively search one or more subsequent videos of the multimedia database for image frames similar to the identified one or more intermediate images; and
- identify one or more image frames adjacent to each image frame found similar to the identified one or more intermediate images.

19. The computer program product of claim 15, wherein the first pre-defined criteria is satisfied by at least one of the following:
- the quality of the images; and
- the repetition count of the images found.

20. The computer program product of claim 15, wherein the second pre-defined criteria is satisfied by at least one of the following:
- at least one image frame identified from a video being absent in a previously searched video;
- the quality of the at least one intermediate image; and
- the number of images preferred by the user in the image tour.

21. The computer program product of claim 15, wherein at least one component of the computer program product is operable to generate the image tour in response to a search query in a secondary multimedia database searched and prepared from the one or more multimedia databases based on the information determined from the analysis of the search query.

* * * * *